US010051553B2

(12) United States Patent
Nakata et al.

(10) Patent No.: US 10,051,553 B2
(45) Date of Patent: Aug. 14, 2018

(54) WIRELESS COMMUNICATION SYSTEM IN WHICH NODEB BROADCASTS IDENTIFICATION INFORMATION ON RELAY APPARATUS

(71) Applicant: NEC Corporation, Minato-ku, Tokyo (JP)

(72) Inventors: Atsushi Nakata, Tokyo (JP); Yoshio Ueda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/729,761

(22) Filed: Oct. 11, 2017

(65) Prior Publication Data

US 2018/0049105 A1 Feb. 15, 2018

Related U.S. Application Data

(63) Continuation of application No. 13/258,922, filed as application No. PCT/JP2010/053240 on Mar. 1, 2010.

(30) Foreign Application Priority Data

Apr. 23, 2009 (JP) ................................. 2009-105629

(51) Int. Cl.
*H04W 48/08* (2009.01)
*H04W 84/04* (2009.01)
*H04W 36/04* (2009.01)
*H04W 36/00* (2009.01)

(52) U.S. Cl.
CPC ........ *H04W 48/08* (2013.01); *H04W 36/0061* (2013.01); *H04W 36/04* (2013.01); *H04W 84/045* (2013.01); *H04W 84/047* (2013.01)

(58) Field of Classification Search
CPC .......................... H04W 36/14; H04W 36/0083
See application file for complete search history.

(56) References Cited

U.S. PATENT DOCUMENTS

| | | | |
|---|---|---|---|
| 2005/0153692 A1 | 7/2005 | Hwang et al. | |
| 2007/0097938 A1 | 5/2007 | Nylander et al. | |
| 2008/0310321 A1 | 12/2008 | Grilli et al. | |
| 2009/0156213 A1 | 6/2009 | Spinelli et al. | |
| 2009/0310532 A1* | 12/2009 | Neil ..................... | H04J 11/0093 370/328 |

(Continued)

FOREIGN PATENT DOCUMENTS

| | | |
|---|---|---|
| CN | 101321383 A | 12/2008 |
| CN | 103607793 A | 2/2014 |

(Continued)

OTHER PUBLICATIONS

International Search Report for PCT/JP2010/053240 dated Jun. 1, 2010.

(Continued)

*Primary Examiner* — Omoniyi Obayanju

(57) ABSTRACT

A wireless communication system includes a first NodeB that forms a cell; and a relay apparatus to which the first NodeB connects and which relays data transmitted and received between the first NodeB and a core network. The first NodeB broadcasts identification information on the relay apparatus to which the first NodeB connects.

7 Claims, 16 Drawing Sheets

(56) References Cited

U.S. PATENT DOCUMENTS

| | | | |
|---|---|---|---|
| 2010/0242103 A1* | 9/2010 | Richardson | H04W 36/0061 726/7 |
| 2010/0260155 A1* | 10/2010 | Grilli | H04B 7/2668 370/336 |
| 2010/0322139 A1 | 12/2010 | Choi et al. | |
| 2011/0237258 A1 | 9/2011 | Nylander et al. | |
| 2012/0034919 A1 | 2/2012 | Nakata et al. | |
| 2012/0044908 A1* | 2/2012 | Spinelli | H04W 92/02 370/331 |

FOREIGN PATENT DOCUMENTS

| | | |
|---|---|---|
| CN | 102415139 B | 10/2015 |
| EP | 2204066 A1 | 7/2010 |
| GB | 2447885 A | 10/2008 |
| JP | 2005-184824 A | 7/2005 |
| JP | 2007-228076 A | 9/2007 |
| JP | 2007-295349 A | 11/2007 |
| JP | 2009-510972 A | 3/2009 |
| KR | 2008-0090029 A | 10/2008 |
| KR | 2013-0113522 A | 10/2013 |
| WO | 2007/136339 A1 | 11/2007 |
| WO | 2007/043117 A1 | 4/2009 |
| WO | 2009/055827 A1 | 4/2009 |
| WO | 2010/122842 A1 | 10/2010 |

OTHER PUBLICATIONS

3GPP TS 25.467 V8.1.0, Technical Specification Group Radio Access Network; UTRAN architecture for 3G Home NodeB; Stage 2 (Release 8), Mar. 2009.
3GPP TS 32.500 V8.0.0, Technical Specification Group Services and System Aspects; Telecommunication Management; Self-Organizing Networks (SON); Concepts and requirements (Release 8), Dec. 2008.
3GPP TS 32.511 V8.1.0, Technical Specification Group Services and System Aspects; Telecommunication Management; Automatic Neighbour Relation (ANR) management; Concepts and requirements, Mar. 2009.
3GPP TS 32.521 V0.3.0, Technical Specification Group Services and System Aspects; Telecommunications Management; Self-Optimization and Self-Healing OAM; Concepts and Requirements (Release 9), Feb. 2009.
3GPP TS 25.413 V8.2.1 Technical Specification Group Radio Access Network; UTRAN Iu interface Radio Access Network Application Part (RANAP) signalling (Release 8) (Mar. 2009).
3GPP TS 25.331 V8.6.0, Technical Specification Group Radio Access Network; Radio Resource Control (RRC); Protocol Specification (Release 8), Mar. 2009, pp. 543-546, 587-611 and 638.
Japanese Office Action for JP2011-510253 dated May 15, 2012.
China Mobile, Add 3G Home NodeB Gateway NRM IOC HnbGwFunction Definition, 3GPP TSG-SA5 S5-091923, Apr. 4, 2009.
Korean Office Action for KR Application No. 10-2011-7027912 dated May 27, 2013 with Partial English Translation.
Korean Office Action for KR Application No. 10-2011-7027912 dated Oct. 28, 2013 with Partial English Translation.
Chinese Office Action for CN Application No. 201080017950.5 dated Oct. 29, 2013 with English Translation.
ZTE, "Handover Procedure Between HNBs," 3GPP TSG-RAN WG3 Meeting #63bis, R3-090759, Mar. 23-26, 2009, pp. 1-4. Cited in CN Office Action.
Chinese Office Action for CN Application No. 201080017950.5 dated Aug. 7, 2014 with English Translation.
3rd Generation Partnership Project; Technical Specification Group Radio Access Network; "On the design of relay node for LTE-advanced", Texas Instruments, 3GPP TSG RAN WG1 #56, R1-090593, Athens, Greece, Feb. 9-13, 2009, pp. 1-11.
3rd Generation Partnership Project; Technical Specification Group Radio Access Network; "Overview of relaying options", Ericsson, 3GPP TSG-RAN WG2 #65bis, R2-092081, Seoul, Korea, Mar. 23-27, 2009, pp. 1-4.
Extended European Search Report for EP Application No. EP10766901.2 dated Oct. 13, 2016.
Chinese Office Action for CN Application No. 201510587687.8 dated Jan. 19, 2018 with English Translation.
Extended European Search Report for EP Application No. EP10766901.2 dated Mar. 5, 2018.

* cited by examiner

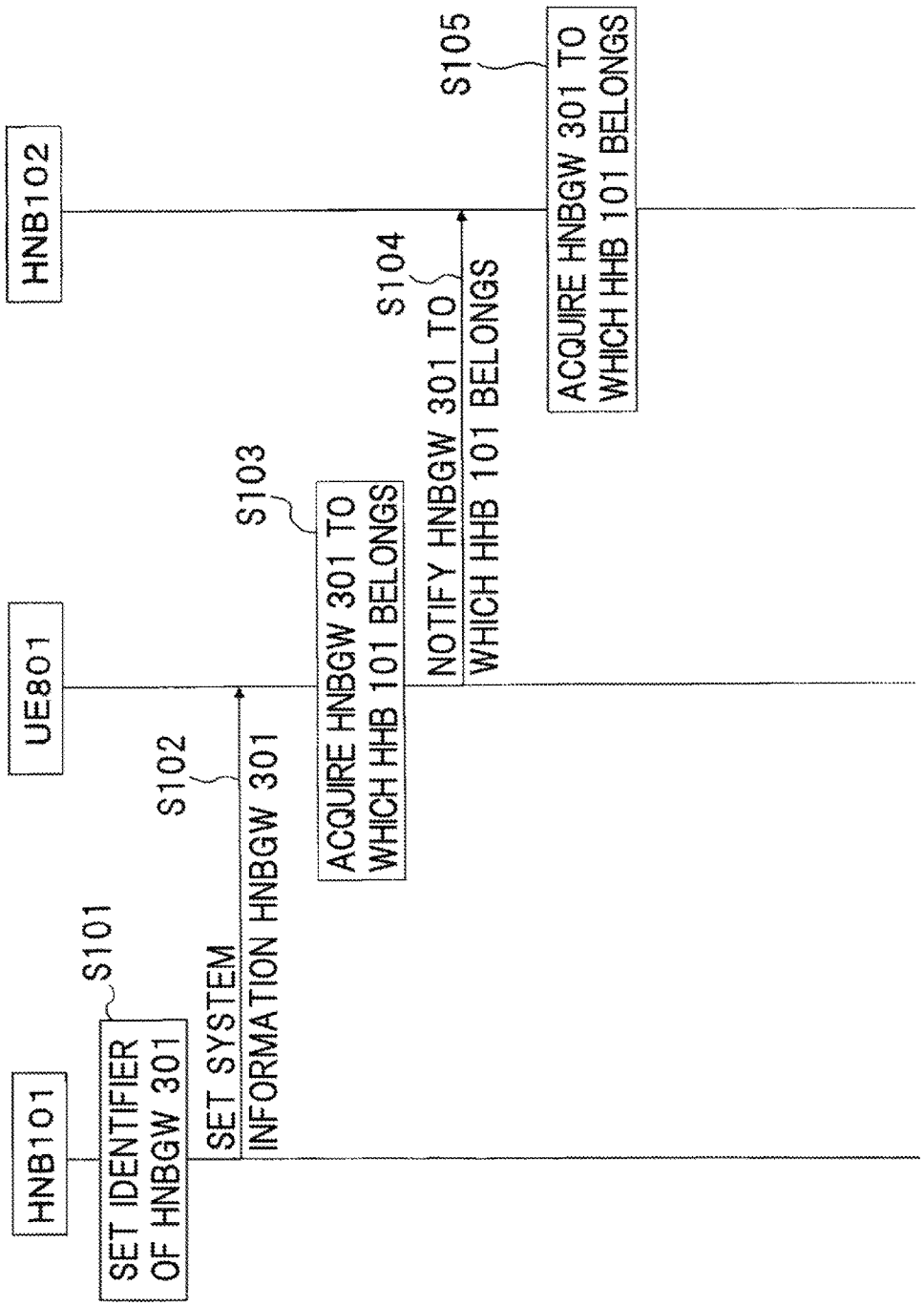

Fig.7

10.2.48.8.6 System Information Block type 3

| Information Element/Group name | Need | Multi | Type and reference | Semantics description | Version |
|---|---|---|---|---|---|
| SIB4 indicator | MP | | Boolean | TRUE indicates that SIB4 is broadcast in the cell. | |
| UTRAN mobility information elements | | | | | |
| Cell identity | MP | | Cell identity 10.3.2.2 | | |
| RNC identity | OP | | RNC identity 10.3.2.x | | |
| Cell selection and re-selection info | MP | | Cell selection and re-selection info for SIB3/4 10.3.2.3 | | |
| : | : | : | : | : | : |

Fig.8

10.3.2.x   RNC identity

This information element identifies an RNC which the cell is belong to unambiguously within a PLMN.

| Information Element/Group name | Need | Multi | Type and reference | Semantics description |
|---|---|---|---|---|
| RNC identity | MP | | bit string (16) | |

10.3.7.3   Cell measured results
Includes non-frequency related measured results for a cell.

| Information Element/Group name | Need | Multi | Type and reference | Semantics description | Version |
|---|---|---|---|---|---|
| Cell identity | OP | | Cell Identity 10.3.2.2 | | |
| RNC identity | OP | | RNC identity 10.3.2.x | | |
| Cell synchronisation information | OP | | Cell synchronisation Information 10.3.7.6 | | |
| : | : | : | : | : | : |

Fig.12

10.3.2.2 Cell identity
This information element identifies a cell unambiguously within a PLMN.
NOTE: This information element may carry any implementation dependent identity that unambiguously identifies a cell within a PLMN. For GAN to UTRAN HO the Cell id is encoded as required in [9].
NOTE: This information element may carry 12 or 16 bit of RNC identity in case the cell is composed by the Home Node B.

| Information Element/Group name | Need | Multi | Type and reference | Semantics description |
|---|---|---|---|---|
| Cell identity | MP | | bit string(28) | |

10.3.7.5 Cell reporting quantities

| Information Element/Group name | Need | Multi | Type and reference | Semantics description |
|---|---|---|---|---|
| Cell synchronisation information reporting indicator | MP | | Boolean | |
| Cell Identity reporting indicator | MP | | Boolean | |
| ANR indicator | OP | | Boolean | |
| CHOICE mode | MP | | | |
| : | : | : | : | : |

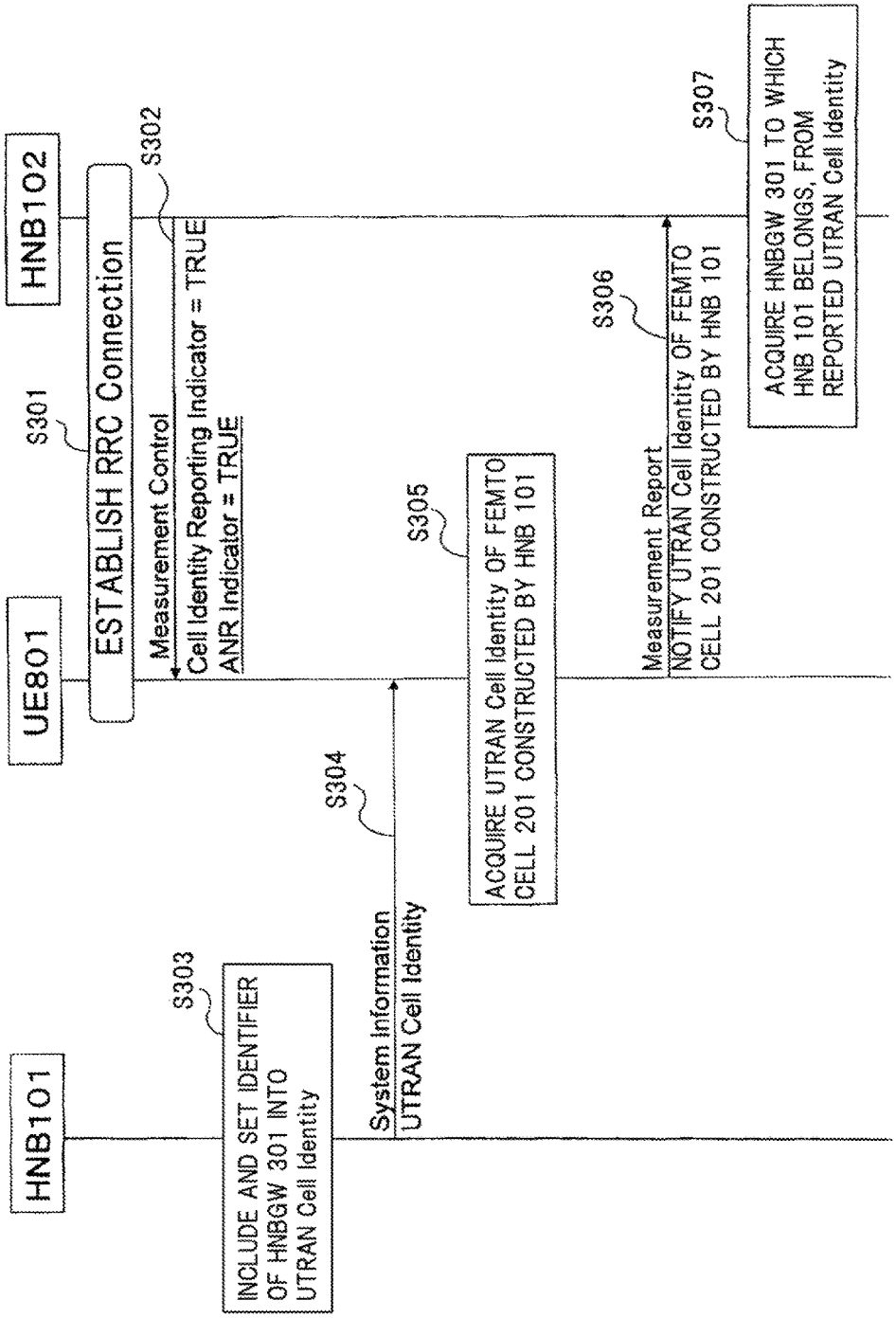

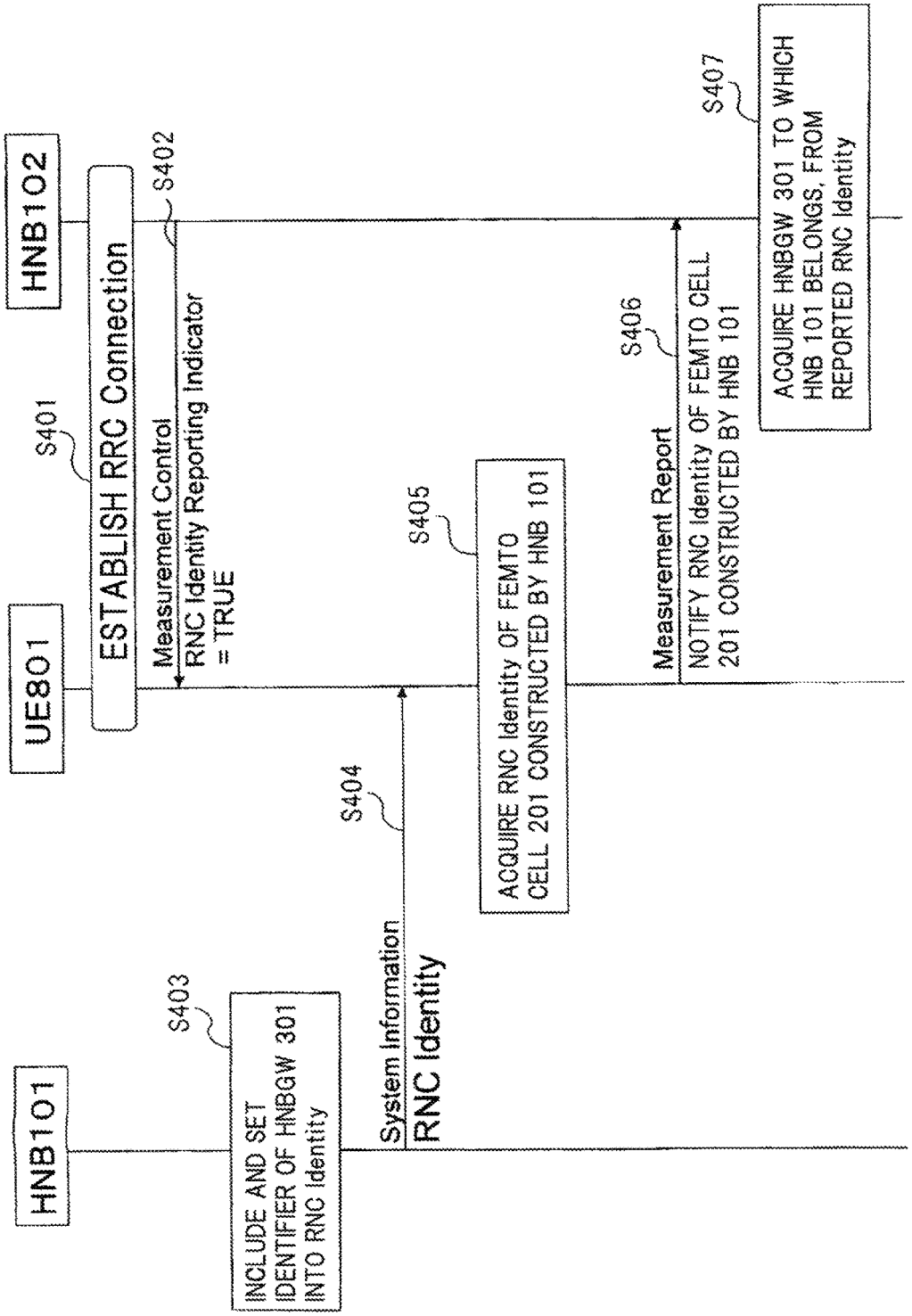

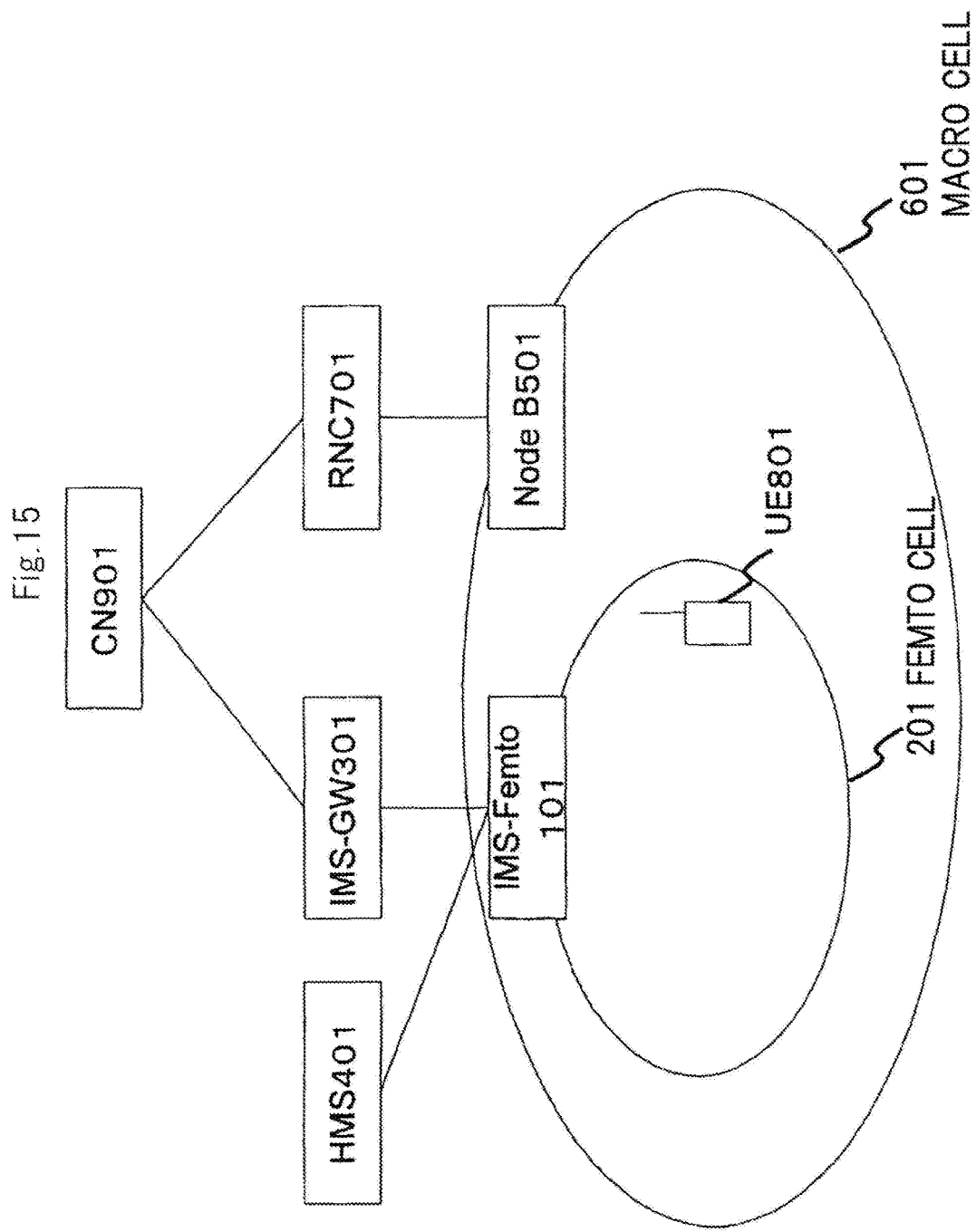

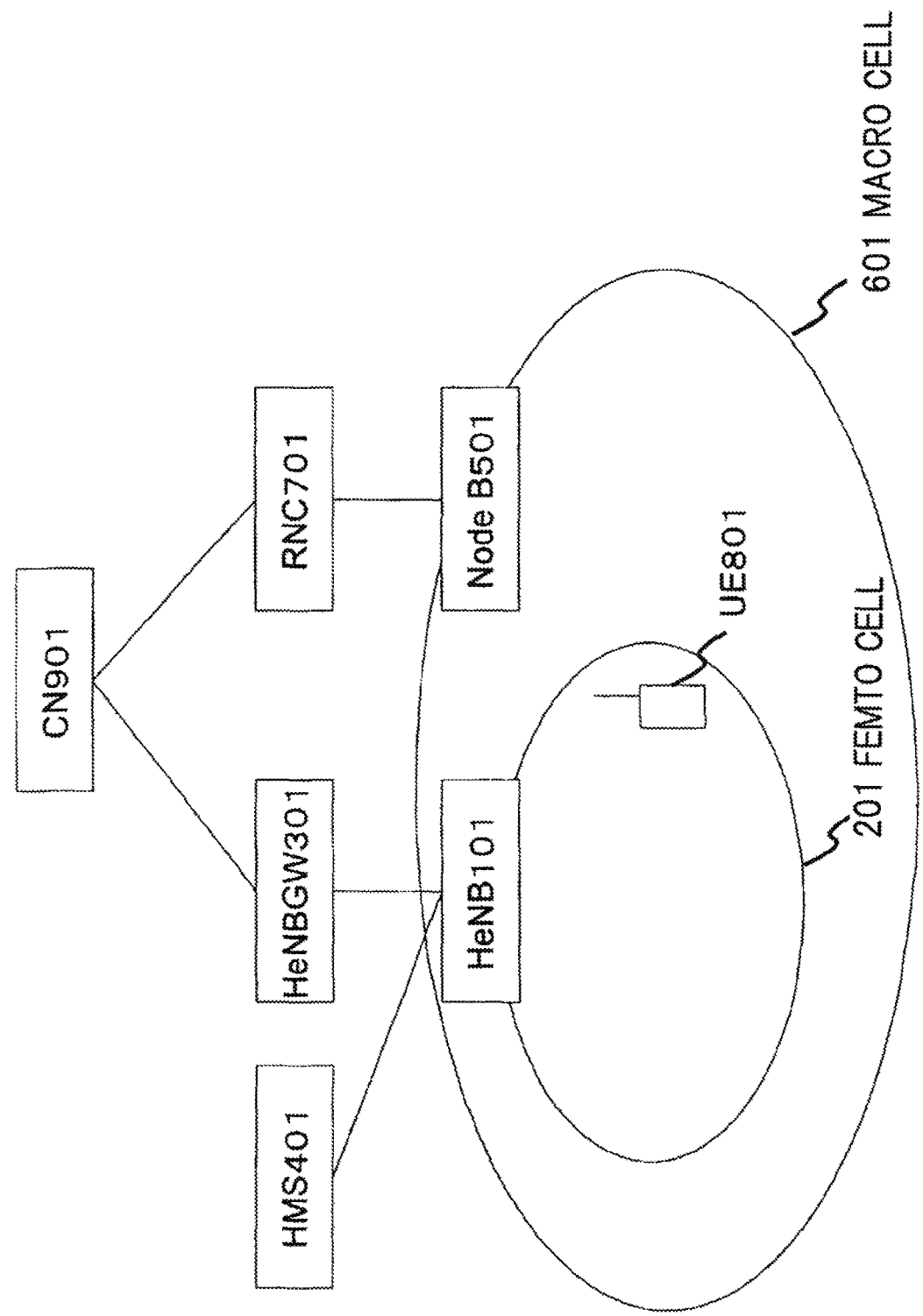

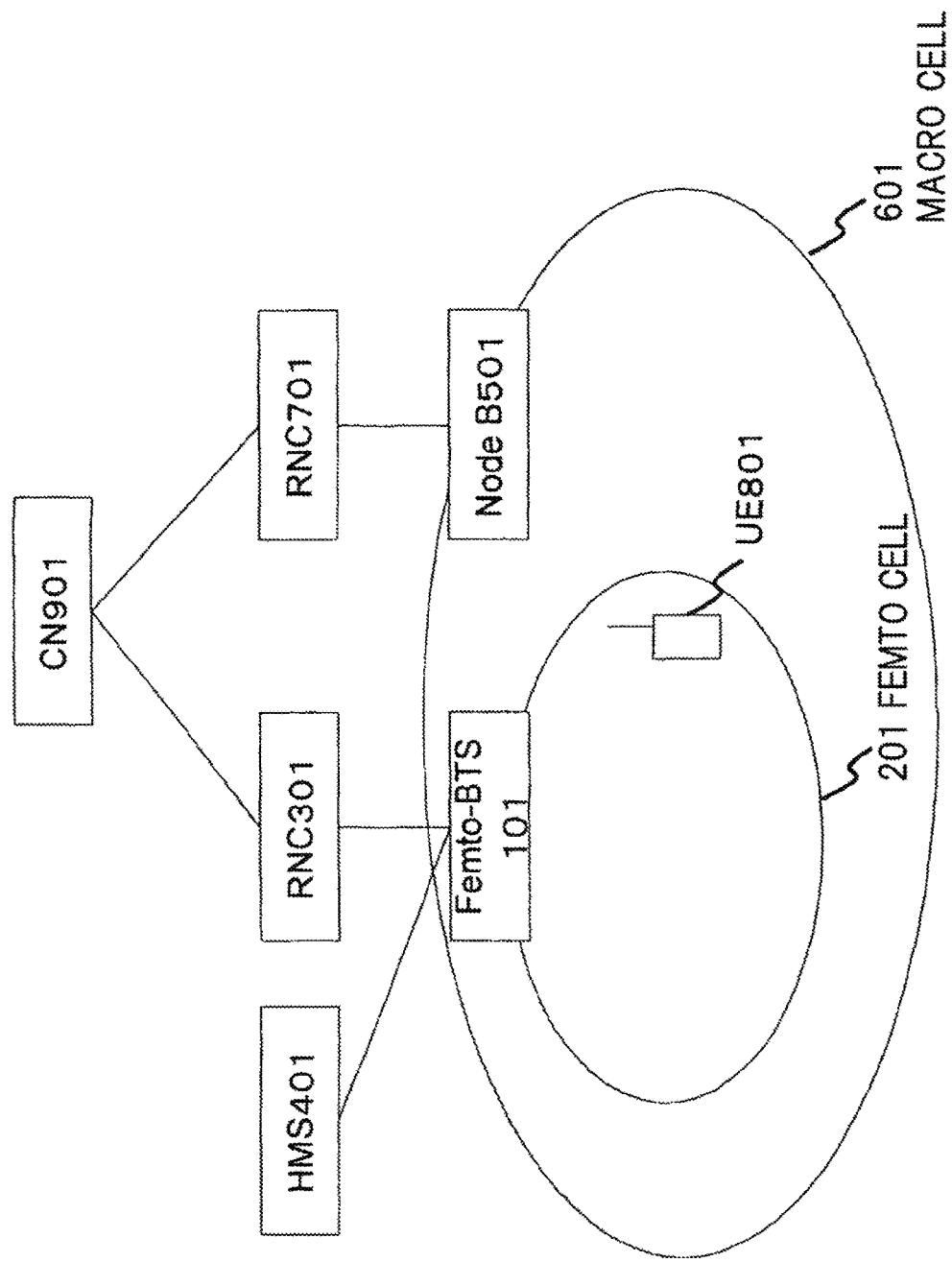

WIRELESS COMMUNICATION SYSTEM IN WHICH NODEB BROADCASTS IDENTIFICATION INFORMATION ON RELAY APPARATUS

REFERENCE TO RELATED APPLICATION

This present application is a Continuation application of application Ser. No. 13/258,922 filed on Sep. 22, 2011, which is a National Stage Entry of International Application PCT/JP2010/053240 filed on Mar. 1, 2010, which claims the benefit of priority from Japanese Patent Application 2009-105629, filed on Apr. 23, 2009, the disclosures of all of which are incorporated in their entirety by reference herein.

TECHNICAL FIELD

The present invention relates to a wireless communication system which forms a cell with a base station to thereby wirelessly connect to mobile user equipment.

BACKGROUND ART

In a general wireless communication system of 3GPP (Third Generation Partnership Project), user equipment (UE) connects to a core network (CN) via a NodeB and a radio network controller (RNC).

An area which is formed by the NodeB and in which wireless communication is enabled is usually a cell with a relatively large radius, which is referred to as "macro cell". In the 3GPP, addition of a small cell referred to as "femto cell" to a wireless communication network including such a general configuration has been considered (see Literature 1).

For example, an architecture has been considered in which an HNB (Home NodeB) is appropriately arranged as a small NodeB forming the femto cell, and the HNB is connected to an HNBGW (HNB Gateway) via a public wired network. For example, the HNB is installed in an indoor area such as at home or a company.

The HNBGW is a relay apparatus that relays data mutually transmitted and received between the HNB and the core network, and is logically arranged between the HNBGW and the core network. The HNB is also connected to an HMS (HNB Management System) via the public wired network. The HMS is a management apparatus that manages a parameter of the HNB and configuration information on the HNB. Generally, the HNBs can belong to the HNBGW and the HMS.

FIG. 18 is a block diagram showing a configuration example of a wireless communication system that deploys both the macro cells and the femto cells. With reference to FIG. 18, this wireless communication system includes NodeBs 501 and 502, RNC 701, HNBs 101 and 102, HNBGW 301 and HMS 401. NodeBs 501 and 502 form macro cells 601 and 602, and HNBs 101 and 102 form femto cells 201 and 202, respectively.

NodeBs 501 and 502 are connected to RNC 701, and RNC 701 is connected to core network node 901.

HNBs 101 and 102 are connected to HNBGW 301 and HMS 401 via public wired network 1000. HNBGW 301 is connected to core network node 901. Here, while the example is shown in which HNB 101 and HNB 102 are connected to same HNBGW 301 and same HMS 401, HNB 101 and HNB 102 may also be configured to be connected to a different HNBGW and a different HMS, respectively.

In the wireless communication system in such a configuration, UE 802 can preferably connect to all of NodeBs 501 and 502 as well as HNBs 101 and 102, and furthermore, can preferably perform handover among them. In a 3GPP-WCDMA system, an SRNS Relocation Procedure is used for the handover (see Literature 5), and thus execution of this procedure is preferably enabled.

Moreover, in the future, introduction of SON (Self-Organizing Networks) is expected as a function of constructing a network configuration without the need for manual input by an operator, or with a minimum amount of manual input by an operator (see Literature 2). For example, automatic neighbour cell relation construction (see Literature 3), a self-optimizing network configuration (see Literature 4) and the like have drawn attention.

LITERATURES

Literature 1: 3GPP TS 25.467 V8.1.0, UTRAN architecture for 3G Home NodeB; Stage 2

Literature 2: 3GPP TS 32.500 V8.0.0, Telecommunication Management; Self-Organizing Networks (SON); Concepts and requirements Literature 3: 3GPP TS 32.511 V8.1.0, Telecommunication management; Automatic Neighbour Relation (ANR) management; Concepts and requirements Literature 4: 3GPP TS32.521 V0.3.0, Telecommunication management; Self-Organizing Networks (SON); Self-optimization and self-healing; Concepts and requirements Literature 5: 3GPP TS 25.413 V8.2.1, UTRAN Iu interface Radio Access Network Application Part (RANAP) signalling

SUMMARY OF INVENTION

Here, attention is focused on handover with the femto cell as a target. The handover with the femto cell as the target includes the handover from the macro cell to the femto cell and the handover from the femto cell to the femto cell.

In the handover, switching the connection from a source side to a target side is performed by core network node 901. Thus, in order to realize the handover with the femto cell as the target, core network node 901 needs to be notified of identification information on HNBGW 301 to which the HNB forming the femto cell as the target belongs, by some means. However, at present, no appropriate method in which the source side acquires the identification information on HNBGW 301 on the target side has been established for notifying core network node 901 of the identification information on HNBGW 301 on the target side.

For example, in an existing 3GPP-WCDMA system in a configuration of CN-RNC-NodeB-UE, information on the femto cell is not set at any node. Thus, when the UE moves from the macro cell to the femto cell, the RNC on the source side cannot know the RNC id of the HNBGW to which the HNB forming the femto cell belongs, which is to be set in the SRNS Relocation Procedure for the handover. As a result, the SRNS Relocation procedure from the macro cell to the femto cell cannot be prepared.

Moreover, in an HNB architecture in a configuration of CN-HNBGW-HNB-UE, there has been no method of notifying the HNBGW to which the HNB that forms a neighbour femto cell belongs, without involving the HMS that performs centralized control via public wired network 1000. Moreover, even with involving the HMS, it has been difficult to immediately prepare the SRNS Relocation Procedure from the femto cell to the femto cell. Furthermore, in a case where the HNB on the source side and the HNB on the target side connect to separate HMSs, respectively, in order for the HNB on the source side to know the RNC Id of the HNB GW to which the HNB on the target side belongs even if the HNB on the source side acquires the RNC Id of the HNB GW via the HMS on the target side, the information needs to be exchanged between the HMSs, which causes a problem in which the system becomes complicated.

Moreover, the above described SON function also needs the identification information on the HNBGW to which each HNB belongs. However, since no method of efficiently transmitting the identification information has been established, it has not been possible to quickly notify the HNBGW or the HNB belonging to the HNBGW, of the identification information on another HNBGW.

It is an object of the present invention to provide a technique for efficiently transmitting the identification information on the relay apparatus to which the NodeB forming the cell belongs.

In order to achieve the above described object, a wireless communication system of the present invention includes:

a first NodeB that forms a cell; and a relay apparatus that is connected to the first NodeB and relays data transmitted and received between the first NodeB and a core network, wherein the first NodeB broadcasts identification information on the relay apparatus that is connected to the first NodeB.

A NodeB of the present invention is a NodeB that is connected to a core network via a relay apparatus and wirelessly forms a cell to connect to user equipment, the NodeB including:

a transmitter that broadcasts information that has been set, to the cell; and a setter that sets identification information on the relay apparatus to which the NodeB itself is connected, into the transmitter, as the information to be broadcast to the cell.

A communication control method of the present invention is a communication control method for a wireless communication system using a cell, the method including:

broadcasting identification information on a relay apparatus that is connected to a first NodeB and that relays data transmitted and received between the first NodeB and a core network, by the first NodeB forming the cell.

BRIEF DESCRIPTION OF DRAWINGS

FIG. 6 is a sequence diagram showing operations of the wireless communication system according to a first exemplary embodiment.

FIG. 7 is a diagram showing a description example of 3GPP TS25.331 that enables the first exemplary embodiment.

FIG. 8 is a diagram showing a description example of the 3GPP TS25.331 that enables the first exemplary embodiment.

FIG. 12 is a diagram showing a description example of the 3GPP TS25.331 that enables the third exemplary embodiment.

FIG. 13 is a sequence diagram showing operations when the UE notifies an identifier of a femto cell in response to a request from the HNB, in the wireless communication system according to the third exemplary embodiment.

FIG. 14 is a sequence diagram showing operations when the UE notifies an identifier to be transmitted to the femto cell in response to the request from the HNB, in the wireless communication system according to a fourth exemplary embodiment.

FIG. 15 is a block diagram showing a configuration of the wireless communication system according to a fifth exemplary embodiment.

FIG. 16 is a block diagram showing the configuration of the wireless communication system according to a sixth exemplary embodiment.

FIG. 17 is a block diagram showing the configuration of the wireless communication system according to a seventh exemplary embodiment.

DESCRIPTION OF EMBODIMENTS

An exemplary embodiment will be described in detail with reference to the drawings.

Figure 1:
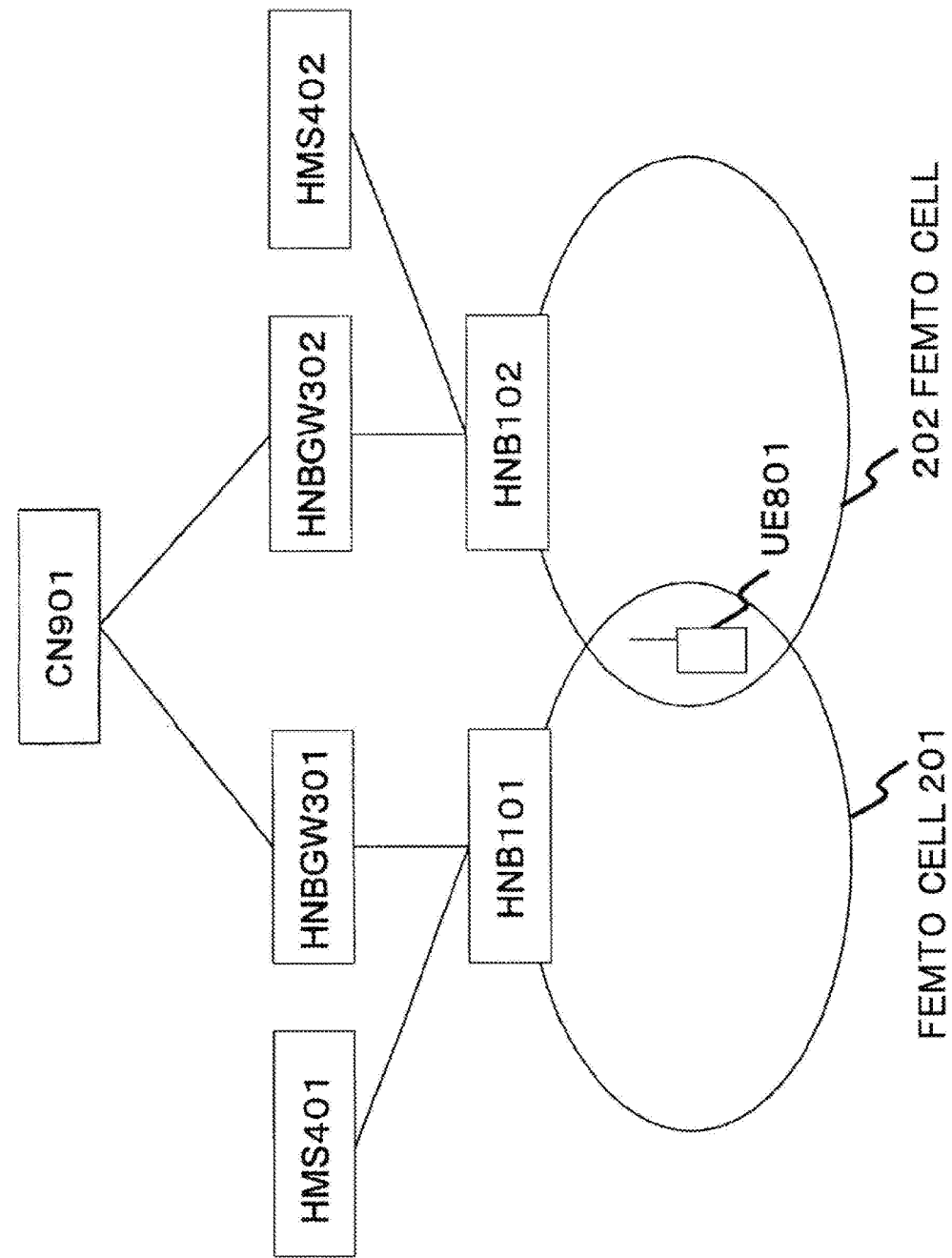
FIG. 1 is a block diagram showing a configuration example of a wireless communication system according to an exemplary embodiment.
Figure 2:
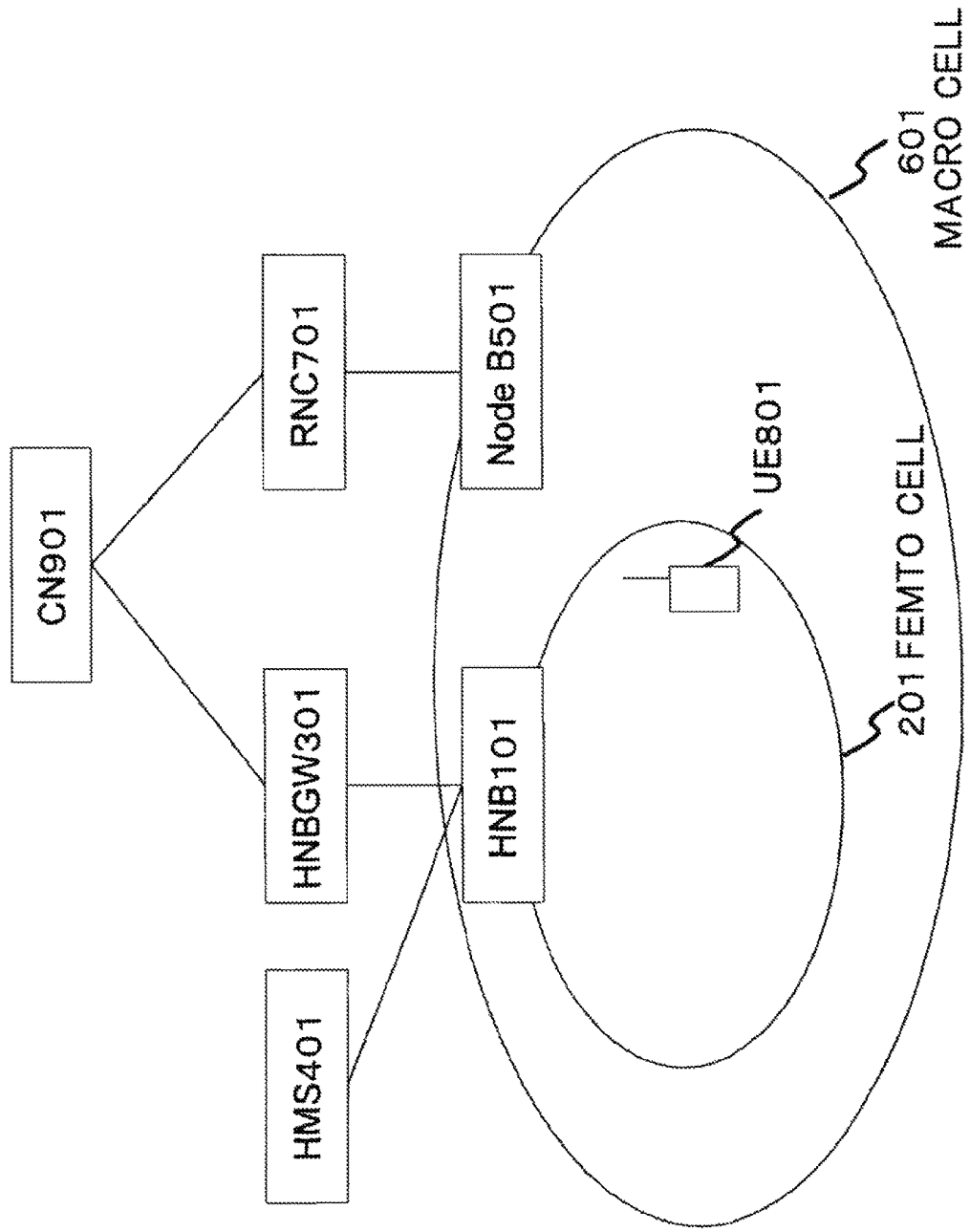
FIG. 2 is a block diagram showing a configuration example of the wireless communication system according to the exemplary embodiment.

FIGS. 1 and 2 are block diagrams showing configuration examples of a wireless communication system according to the exemplary embodiment. With reference to FIG. 1 or 2, the wireless communication system according to the present exemplary embodiment includes HNB 101 that is a NodeB forming femto cell 201, and HNBGW 301 that is a relay apparatus to which HNB 101 belongs.

HNB 101 connects to HNBGW 301, and HNBGW 301 connects to CN 901 that is a node of a core network. HNBGW 301 is an apparatus that exists between HNB 101 and CN 901, and relays data that is mutually transmitted and received between HNB 101 and CN 901. Moreover, HNB 101 connects to HMS 401 that is a management apparatus that manages a parameter of HNB 101 and configuration information on HNB 101.

HNB 101 of the present exemplary embodiment broadcasts identification information on HNBGW 301 to which HNB 101 itself belongs, in femto cell 201. In an example of a 3GPP-WCDMA system, HNB 101 may broadcast an RNCid for HNBGW that is the identification information on HNBGW 301, as an RNC Identity information element in System Information.

The broadcasted identification information is received by an apparatus (UE 801, HNB 102 or NodeB 501) within the range that a radio wave of femto cell 201 reaches, and is distributed within the wireless communication system, if necessary. In the wireless communication system, the identification information is used, for example, for handover with femto cell 201 as a target, or for construction of a network configuration by an SON function.

As described above, according to the present exemplary embodiment, since HNB 101 forming femto cell 201 broadcasts the identification information on HNBGW 301 to which HNB 101 belongs, the identification information on HNBGW 301 can be efficiently transmitted.

As a cell arrangement in the neighbourhood of femto cell 201 formed by HNB 101, various configurations are conceivable depending on the cell design of the system. Different examples are shown in FIGS. 1 and 2, respectively.

In the example of FIG. 1, there is another femto cell 202 in the neighbourhood of femto cell 201 formed by HNB 101. This femto cell 202 is formed by HNB 102. HNB 102 belongs to HNBGW 302 that is different from HNBGW 301 to which HNB 101 belongs. Furthermore, HNB 102 connects to HMS 402. Here, it is assumed that UE 801 that is user equipment is positioned where UE 801 can receive radio waves from both HNBs 101 and 102, and connects to and communicates with HNB 102 via femto cell 202.

In the example of FIG. 2, there is macro cell 601 including femto cell 201 formed by HNB 101. This macro cell 601 is formed by NodeB 501. NodeB 501 belongs to RNC 701 that is a radio network controller, and is managed by RNC 701. Here, it is assumed that UE 801 is positioned where UE 801 can receive radio waves from both HNB 101 and NodeB 501, and connects to and communicates with NodeB 501 via macro cell 601.

In each case of FIGS. 1 and 2, UE 801 receives the identification information on HNBGW 301 that is broadcast by HNB 101, and notifies the NodeB to which UE 801 itself connects, of the identification information. In the example of FIG. 1, UE 801 notifies HNB 102 of the identification information. In the example of FIG. 2, UE 801 notifies NodeB 501 of the identification information (transmits the identification information to NodeB 501).

Note that UE 801 may always perform an operation for, when receiving the identification information on the relay apparatus (HNBGW 301) broadcast by the NodeB (HNB 101) other than the NodeB to which UE 801 itself connects, notifying the identification information. Moreover, UE 801 may perform the operation only if UE 801 is explicitly requested to perform the operation. To perform the operation only when being explicitly requested is mainly effective for the SON function.

For example, the NodeB to which UE 801 connects (HNB 102 in FIG. 1, and NodeB 501 in FIG. 2) may request UE 801 to notify the identification information. In that case, in response to the request, UE 801 may observe the identification information broadcast by a neighbour NodeB (HNB 101), and notify the NodeB that has made the request (HNB 102 in FIG. 1, and NodeB 501 in FIG. 2), of the observed identification information.

In the 3GPP-WCDMA system, a Measurement Control message may be used as a message through which the notification of the identification information is requested, and a Measurement Report message may be used as a message through which the identification information is notified.

Furthermore, the Measurement Control message through which notification of the identification information is requested may include a Cell Identity Reporting Indicator information element that is set to TRUE, and an ANR Indicator information element that is set to TRUE. Thereby, UE 801 can distinguish the Measurement Control message through which notification of the identification information is requested, from other Measurement Control messages.

Furthermore, in the Measurement Report message through which the identification information is notified, the identification information may be stored in a Cell Identity information element.

Moreover, depending on the cell arrangement in the neighbourhood of femto cell 201, HNB 102 or NodeB 501 may directly receive the identification information on HNBGW 301 that is broadcast by HNB 101, without involving UE 801.

Figure 3:
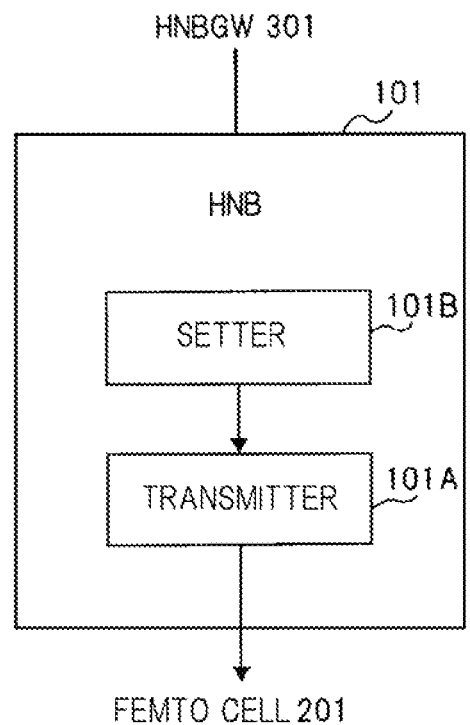
FIG. 3 is a block diagram showing a configuration of HNB 101.

FIG. 3 is a block diagram showing a configuration of HNB 101. HNB 101 is the NodeB that is connected to the core network (not shown) via HNBGW 301 and wirelessly forms femto cell 201 to connect to the user equipment. With reference to FIG. 3, HNB 101 includes transmitter 101A and setter 101B.

Transmitter 101A broadcasts information set by setter 101B, to the femto cell.

Setter 101B sets the identification information on HNBGW 301 that is the relay apparatus to which HNB 101 itself belongs, into transmitter 101A, as the information to be broadcast to femto cell 201.

Figure 4:
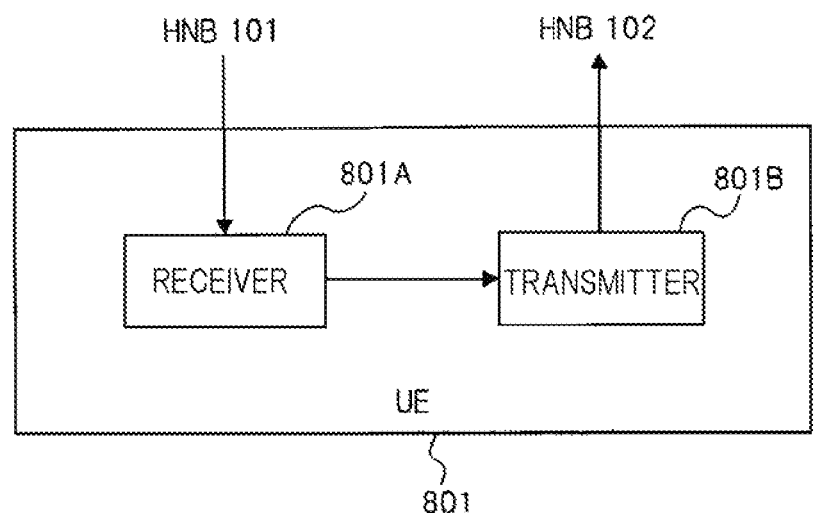
FIG. 4 is a block diagram showing a configuration of UE 801.

FIG. 4 is a block diagram showing a configuration of UE 801. UE 801 is a terminal apparatus that connects to the core network via the NodeB such as HNB 101 or 102, or NodeB 501, and transmits and receives data. With reference to FIG. 4, UE 801 includes receiver 801A and transmitter 801B.

Receiver 801A receives the identification information on HNBGW 301 that is broadcast by HNB 101 forming the femto cell. Transmitter 801B notifies HNB 102 to which UE 801 itself connects, of the identification information received by receiver 801A. For example, when being requested by HNB 102 to notify the identification information, receiver 801A may receive the identification information broadcast by HNB 101.

Figure 5:
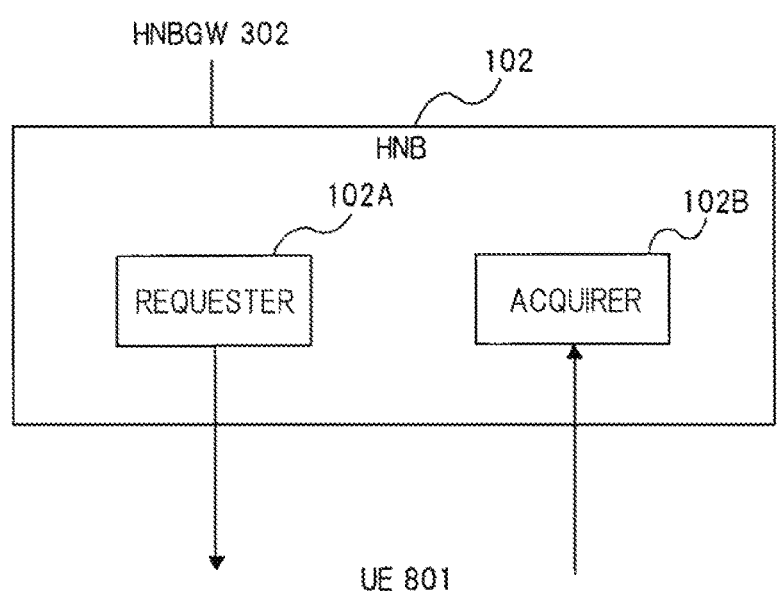
FIG. 5 is a block diagram showing a configuration of HNB 102.

FIG. 5 is a block diagram showing a configuration of HNB 102. HNB 102 is the NodeB in whose area UE 801 is located and to which UE 801 connects. With reference to FIG. 5, HNB 102 includes requester 102A and acquirer 102B.

Requester 102A requests UE 801 which connects to HNB 102 itself, to notify the identification information broadcast by the NodeB (here, HNB 101) that forms the femto cell. Acquirer 102B acquires the identification information on HNBGW 301 that is notified by the UE in response to the request from requester 102A.

This identification information on HNBGW 301 is used, for example, for the handover with femto cell 201 as the target, or for the construction of the network configuration by the SON function. In the handover, acquirer 102B notifies the core network of the acquired identification information via HNBGW 302. The core network specifies a path to a handover target based on the notified identification information. In the SON function, acquirer 102B notifies HMS 402 of the acquired identification information. HMS 402 executes the SON function based on the information notified by each NodeB managed by HMS 402 itself.

Note that, here, for convenience of explanation, while functions of the HNB have been divided into HNB 102 (FIG. 5) to which UE 801 connects, and HNB 101 (FIG. 3) that broadcasts the information to UE 801, and described, the actual HNB includes the functions of both HNBs 101 and 102.

Moreover, here, while the HNB has been illustrated as NodeB to which UE 801 connects, even NodeB 501 similarly includes the configuration of FIG. 5.

Various configurations or operations may be employed to attempt to further embody the above described exemplary embodiment. Hereinafter, some of the specific exemplary embodiments of the present exemplary embodiment will be described.

First Exemplary Embodiment

A basic configuration of the wireless communication system according to a first exemplary embodiment is similar to those shown in FIGS. 1 and 2. As shown in FIG. 1, HNB 101 that forms femto cell 201 belongs to HNBGW 301, and a network parameter related to HNB 101 is managed by HMS 401. Similarly, HNB 102 that forms femto cell 202 belongs to HNBGW 302, and a network parameter of HNB 102 is managed by HMS 402. HNB 101 and HNB 102 are in a neighbour relationship with each other, but are managed by different HMSs, respectively.

Here, it is assumed that HNB 102 cannot acquire the identification information (identifier) on HNBGW 301 to which HNB 101 belongs, from HMS 402. Moreover, similarly, it is assumed that HNB 101 cannot acquire the identification information (identifier) on HNBGW 302 to which HNB 102 belongs, from HMS 401.

Note that, here, while the example is shown in which HNB 101 and HNB 102 belong to different HNBGWs and moreover belong to the different HMSs, the present invention is not limited to this configuration. As another configuration, HNB 101 and HNB 102 may belong to the same HNBGW, or HNB 101 and HNB 102 may belong to the same HMS. Furthermore, HNB 101 and HNB 102 may belong to the same HNBGW and belong to the same HMS.

Moreover, as the cell arrangement in the neighbourhood of femto cell 201 that is formed by HNB 101, various configurations are conceivable depending on the cell design of the system, and FIG. 1 is an example thereof. As shown in FIG. 2, macro cell 601 including femto cell 201 may exist in the neighbourhood of femto cell 201 formed by HNB 101. In the configuration of FIG. 2, UE 801 notifies NodeB 501 forming macro cell 601, or RNC 701 to which NodeB 501 belongs, of the identifier of HNBGW 301.

FIG. 6 is a sequence diagram showing operations of the wireless communication system according to the first exemplary embodiment. While an operation example that assumes the configuration of FIG. 1 is shown in FIG. 6, the operation example is also similar to the configuration of FIG. 2.

With reference to FIG. 6, first, HNB 101 sets the identifier of HNBGW 301 to which HNB 101 belongs, as a parameter, in System Information on femto cell 201 formed by HNB 101 (step S101). Thereby, the System Information including the identifier of HNBGW 301 is broadcast in femto cell 201 (step S102).

Here, it is assumed that UE 801 is located in an area of femto cell 202, and is moving toward femto cell 201 in a state where UE 801 connects to and communicates with HNB 102 forming femto cell 202.

When entering an area of femto cell 201 of HNB 101, UE 801 receives the System Information broadcast by HNB 101 to femto cell 201. Then, UE 801 acquires the identifier of HNBGW 301 to which HNB 101 belongs, from the received System Information (step S103).

When acquiring the identifier of HNBGW 301, UE 801 notifies HNB 102 to which UE 801 connects, of the identifier of HNBGW 301 to which HNB 101 that configures femto cell 201 belongs (step S104). A method of the notification is, as an example, a method of using an RRC Measurement Report message provided in 3GPP TS25.331, to notify the identifier of HNBGW 301 as a parameter thereof.

HNB 102 receives the notification from UE 801, and acquires the identifier of HNBGW 301 to which HNB 101 that forms femto cell 201 that is present in the neighbourhood belongs (step S105).

FIG. 7 is a diagram showing a description example of the 3GPP TS25.331 that enables the first exemplary embodiment. With reference to FIG. 7, in Section 10.2.48.8.6, RNC Identity is included as an information element that is set in System Information Block type 3. The identifier of the HNBGW may be stored in this RNC Identity.

Moreover, as an example of the above described RRC Measurement Report message, it is conceivable to store the RNC Identity that is the identifier of HNBGW 301, as Cell measured results in the message. In that case, in the 3GPP TS25.331, the RNC identity of the HNBGW is defined in information elements that may be set as the Cell measured results.

FIG. 8 is a diagram showing a description example of the 3GPP TS25.331 that enables the first exemplary embodiment. In the example of FIG. 8, as Section 10.3.2.x, the RNC Identity is defined. Moreover, in Section 10.3.7.3, the RNC Identity is included in the information elements that are set as the Cell measured results.

As described above, according to the present exemplary embodiment, since HNB 101 includes the identifier of HNBGW 301 to which HNB 101 belongs, in the System Information to be broadcast to femto cell 201 formed by HNB 101, the identifier of HNBGW 301 to which HNB 101 belongs can be distributed to a neighbour system.

Moreover, according to the present exemplary embodiment, since UE 801 receives the System Information in which the identifier of HNBGW 301 to which HNB 101, which is different from HNB 102 to which UE 801 connects, belongs, is set, UE 801 can recognize the identifier of HNBGW 301 to which surrounding HNB 101 belongs.

Moreover, according to the present exemplary embodiment, since UE 801 connecting to HNB 102 notifies HNB 102 of the identifier of HNBGW 301 to which another HNB 101 belongs, HNB 102 can recognize the identifier of HNBGW 301 that is a piece of network configuration information on neighbour HNB 101.

Second Exemplary Embodiment

The basic configuration of the wireless communication system of a second exemplary embodiment is the same as that of the first exemplary embodiment. In the second exemplary embodiment, NodeB (HNB or RNC) includes a function of receiving the identifier of the HNBGW to which an HNB that forms a neighbour femto cell belongs, directly from the HNB. In the second exemplary embodiment, it is assumed that the wireless communication system of the first exemplary embodiment includes this function, in addition to the function shown in the first exemplary embodiment.

Figure 9:
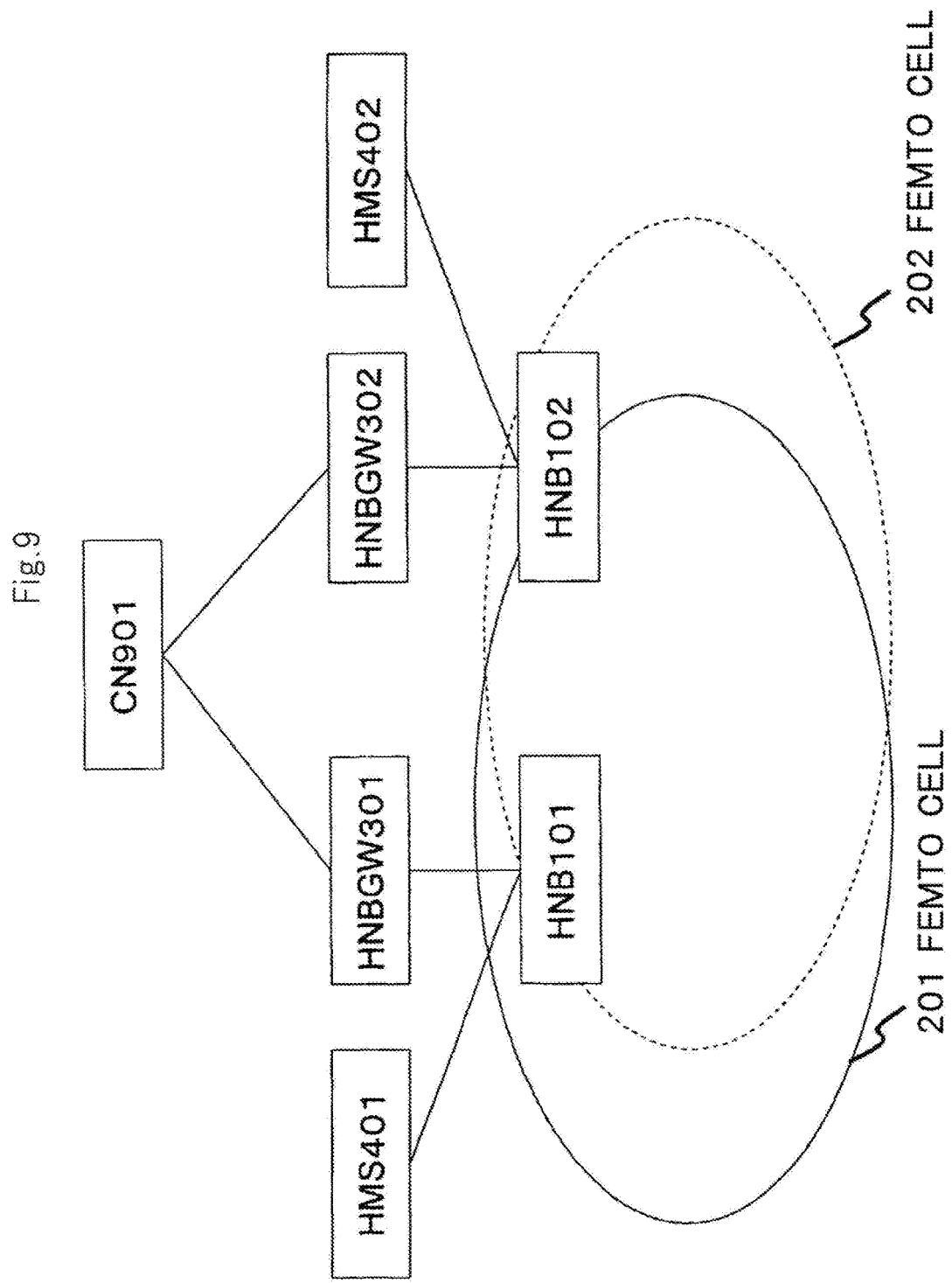
FIG. 9 is a block diagram showing the configuration example of the wireless communication system according to a second exemplary embodiment.

FIG. 9 is a block diagram showing the configuration example of the wireless communication system according to the second exemplary embodiment. The second exemplary embodiment is different from the first exemplary embodiment in that the distance between HNB 102 and HNB 101 is closer than the configuration shown in FIG. 1, and HNB 101 exists within a range of femto cell 202 of HNB 102.

HNB 101 that forms femto cell 201 belongs to HNBGW 301, and the parameter of HNB 101 is managed by HMS 401. HNB 102 exists within a range of femto cell 201.

HNB 102 that forms femto cell 202 belongs to HNBGW 302, and the parameter of HNB 102 is managed by HMS 402.

Here, it is assumed that HNB 102 cannot acquire the identifier of HNBGW 301 to which HNB 101 belongs, from HMS 402, and that HNB 101 cannot acquire the identifier of HNBGW 302 to which HNB 102 belongs, from HMS 401.

Note that, here, while the example is shown in which HNB 101 and HNB 102 belong to different HNBGWs and to different HMS s, the present invention is not limited to this configuration. As another configuration, HNB 101 and HNB 102 may belong to the same HNBGW, or may belong to the same HMS. Furthermore, HNB 101 and HNB 102 may belong to the same HNBGW and belong to the same HMS.

Moreover, as the cell arrangement in the neighbourhood of femto cell 201 formed by HNB 101, the various configurations are conceivable depending on the cell design of the system and FIG. 9 is an example thereof. The RNC forming the macro cell may exist within the range of femto cell 201 formed by HNB 101. In that case, UE 801 may notify the NodeB forming the macro cell, or the RNC to which the NodeB belongs, of the identifier of HNBGW 301.

Figure 10:
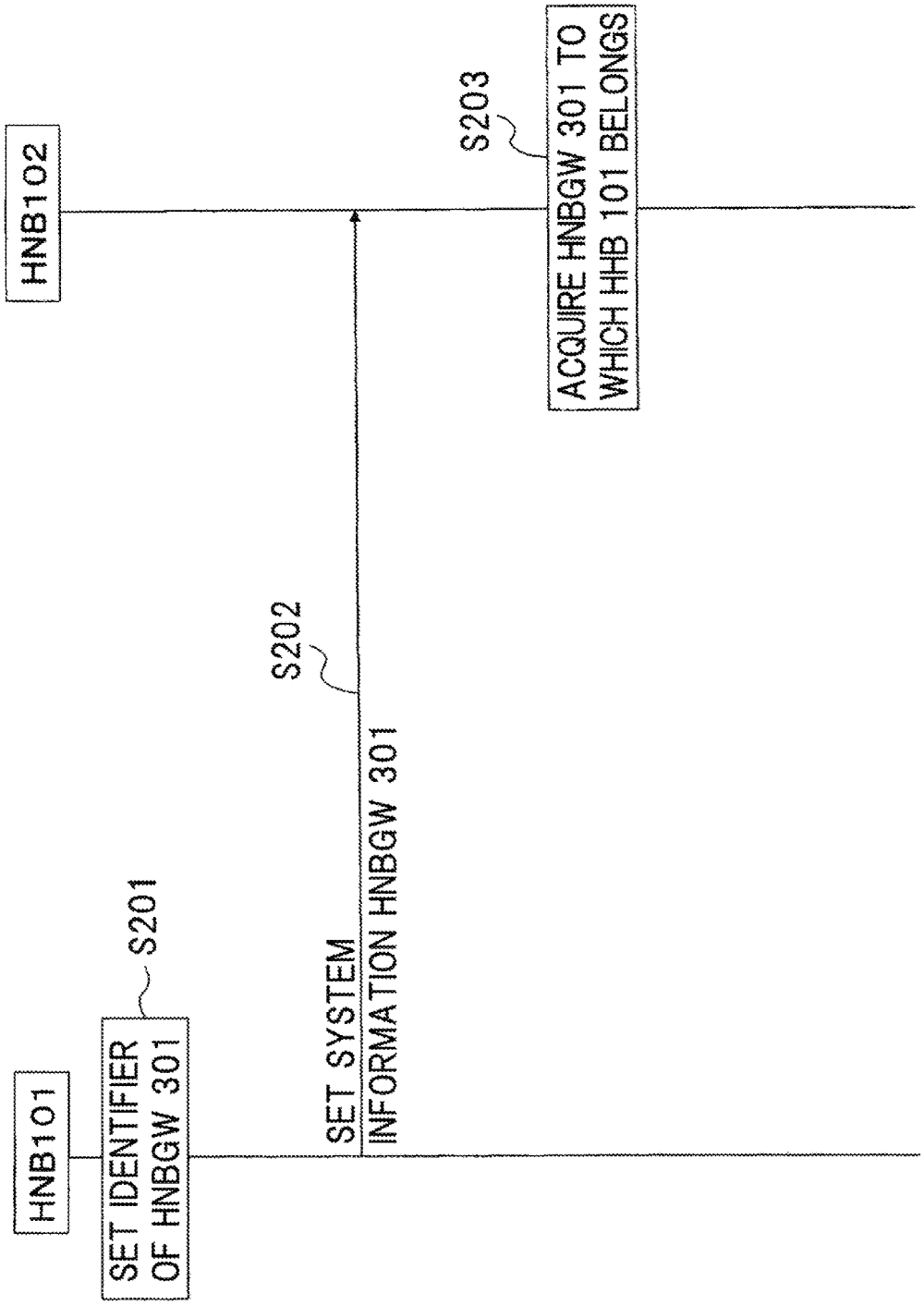
FIG. 10 is a sequence diagram showing the operations of the wireless communication system according to the second exemplary embodiment.

FIG. 10 is a sequence diagram showing the operations of the wireless communication system according to the second exemplary embodiment. While an operation example that assumes the configuration of FIG. 4 is shown in FIG. 10, HNB 102 may be replaced with the RNC.

With reference to FIG. 10, first, HNB 101 sets the identifier of HNBGW 301 to which HNB 101 belongs, as a parameter, in the System Information on femto cell 201 formed by HNB 101 (step S201). Thereby, the System Information including the identifier of HNBGW 301 is broadcast in femto cell 201 (step S202).

Here, since HNB 102 exists within the range of femto cell 201 of HNB 101, HNB 102 receives the System Information on femto cell 201 that is broadcast by HNB 101. Then, HNB 102 acquires the identifier of HNBGW 301 to which HNB 101 belongs, from the received System Information (step S203).

As described above, according to the present exemplary embodiment, since HNB 102 receives the System Information broadcast by HNB 101 that is present in the neighbourhood, HNB 102 can recognize the identifier of HNBGW 301 that is a piece of the network configuration information on neighbour HNB 101.

Third Exemplary Embodiment

In a third exemplary embodiment, the method of notifying the identifier of HNBGW 301 in the first or second exemplary embodiment is further embodied. As basic configuration examples of the wireless communication system according to the present exemplary embodiment, the configurations as shown in FIGS. 1, 2 and 9 are conceivable.

In the third exemplary embodiment, in order to broadcast the identifier of HNBGW 301 to which HNB 101 belongs, HNB 101 includes an RNC id (HNBGW) in an information element referred to as "UTRAN Cell identity" in the System Information.

The RNC id (HNBGW) is an RNC id assigned to the HNBGW. In system architecture including the HNB, while the RNC id is also assigned to the HNB that is the NodeB, it is denoted as "RNC id (HNB)" and is distinguished from the RNC id (HNBGW).

Figure 11:
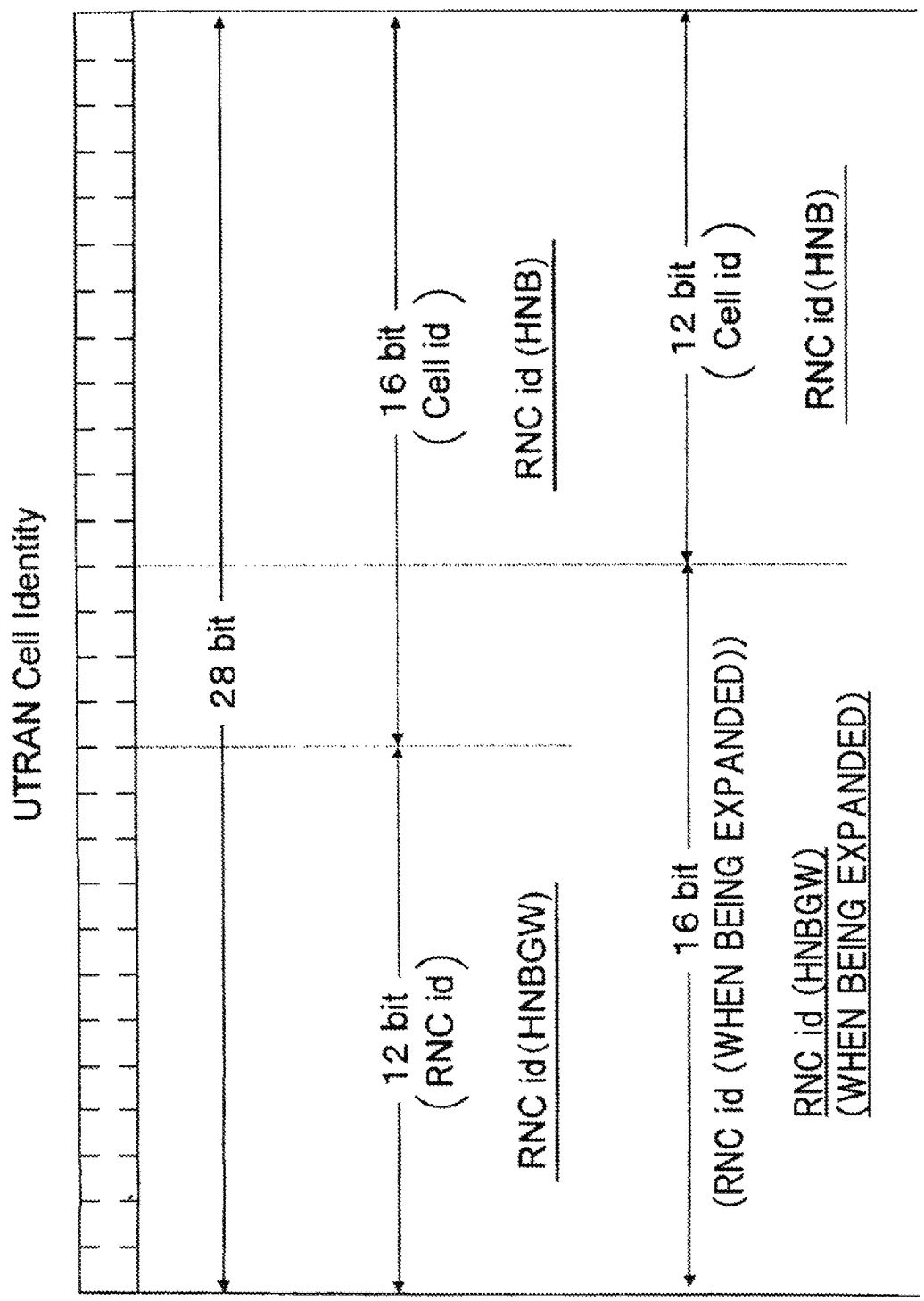
FIG. 11 is a diagram showing content of UTRAN Cell Identity in a third exemplary embodiment.
Figure 18:
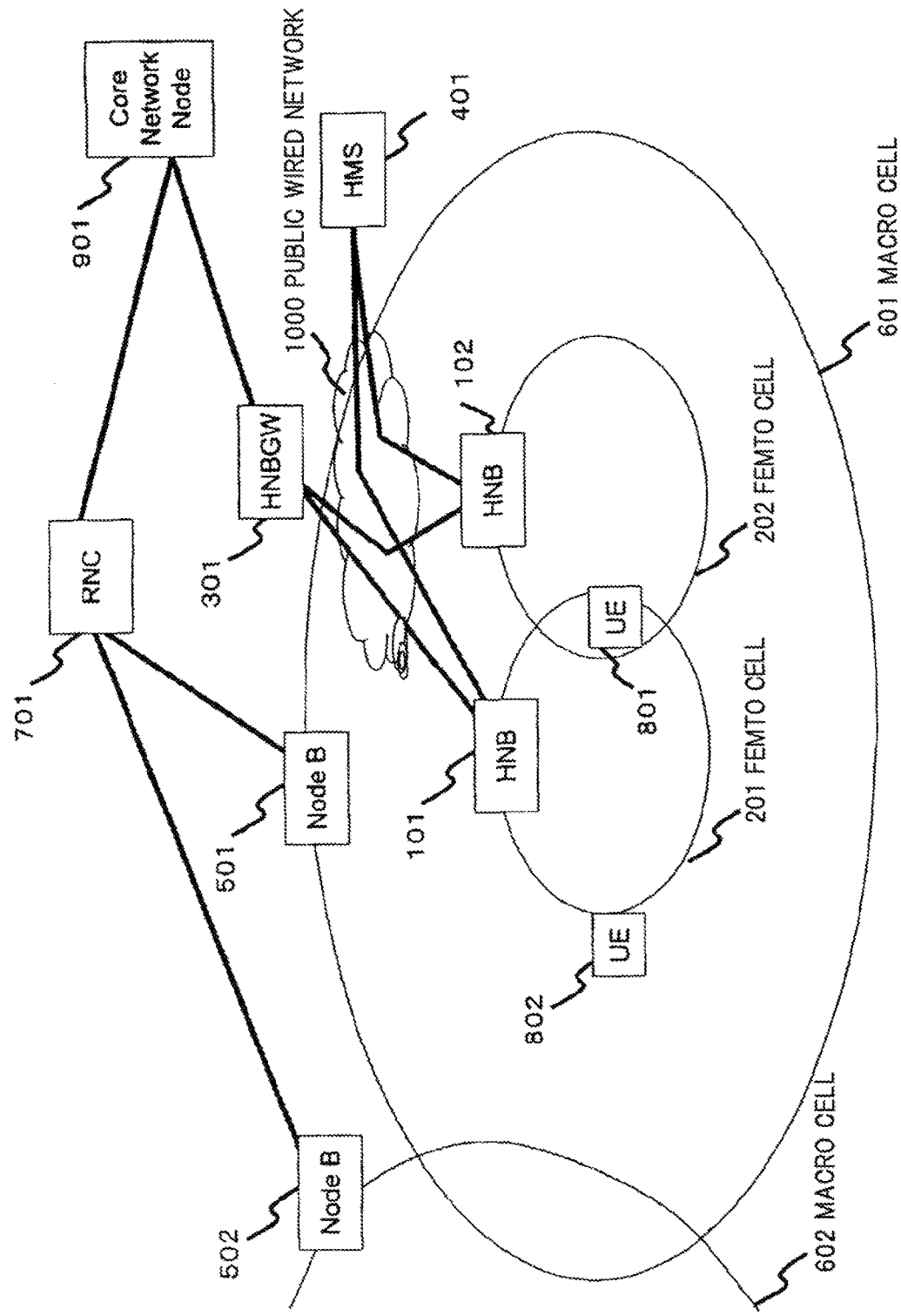
FIG. 18 is a block diagram showing a configuration example of a wireless communication system that deploys both macro cells and femto cells.

FIG. 11 is a diagram showing content of the UTRAN Cell Identity in the third exemplary embodiment. According to current provisions in 3GPP, 28-bit UTRAN Cell identity is included in the System Information. In the TS25.331, it is described that its configuration is implementation dependent. However, generally, its configuration includes the RNC id and a Cell id.

With reference to FIG. 11, the 28-bit UTRAN Cell Identity includes an RNC id field and a Cell id field. Generally, the RNC id field includes 12 bits and the Cell id field includes 16 bits. However, when it is being expanded, the RNC id field includes 16 bits and the Cell id field includes 12 bits.

In the present exemplary embodiment, as shown in FIG. 11, a portion corresponding to the RNC id field is defined as an RNC id (HNBGW) field, and a portion corresponding to the Cell id field is defined as an RNC id (HNB) field.

As an operation of HNB 101, HNB 101 stores the identifier of HNBGW 301 to which HNB 101 belongs, in the RNC id (HNBGW) field corresponding to the RNC id field.

Moreover, in the present exemplary embodiment, HNB 101 stores the RNC id (HNB) that is assigned to HNB 101 itself terminating an RRC (Radio Resource Control) protocol, in the RNC id (HNB) field corresponding to the Cell id field.

Generally, an HNB forms at most a femto cell. Thus, specifying the HNB is equivalent to specifying the femto cell. Consequently, in the System Information broadcast by the HNB, if the RNC id (HNBGW) and the RNC id (HNB) are set instead of the RNC id and the Cell id, in the UTRAN Cell identity that is an existing parameter (information element) that includes 28 bits, a system architecture of HNBGW-HNB-femto cell is uniquely specified.

Note that, if a system that includes a configuration of HNBGW-HNB-femto cell and a system that includes a configuration of RNC-NodeB-macro cell are mixed, it is desirable to maintain uniqueness of the UTRAN Cell Identity assigned to each femto cell and to each macro cell. For this purpose, identifiers may be assigned so that duplication does not occur between values of the RNC id and the Cell id, and between values of the RNC id (HNBGW) and the RNC id (HNB), for example, so that duplication does not occur in upper 12 bits or 16 bits.

Moreover, in the present exemplary embodiment, UE 801 may always perform an operation for, when receiving the identifier of the HNBGW broadcast through the UTRAN Cell identity in the System Information, from HNB 101 that is different from HNB 102 to which UE 801 itself connects, notifying HNB 102 of the identification information. Moreover, UE 801 may perform the operation only if UE 801 is explicitly requested by HNB 102 to perform the operation.

According to 3GPP TS25.331, Section 10.3.7.5, an information element referred to as "Cell Identity Reporting Indicator" is defined, and moreover, TRUE and FALSE are defined as values of the information element. Cell Identity Reporting Indicator=TRUE is for requesting a report of the Cell id (=UTRAN Cell Identity) of a measurement target cell.

However, in the current provisions, in Section 8.6.7.7, it is provided that, even if Cell Identity Reporting Indicator=TRUE, the UE reads it as FALSE.

Consequently, in the present exemplary embodiment, as a method, in Section 8.6.7.7, it is proposed that the indicator not be uniformly read as FALSE in cases where the Cell Identity Reporting Indicator=TRUE.

Specifically, it is assumed that HNB 102 requests that UE 801 provide the Cell Identity of the femto cell, through the Measurement Control message in which Cell Identity Reporting Indicator=TRUE is set. Then, it is assumed that, when receiving the request, UE 801 notifies HNB 102 of the measured Cell Identity, through the Measurement Report message.

Moreover, in the present exemplary embodiment, as another method, a proposal is made to enable the UE to notify the HNB of the UTRAN Cell Identity, by modifying descriptions of Section 8.6.7.7 and related sections as will be described later.

Specifically, it is assumed that HNB 102 requests that UE 801 provide the Cell Identity of the femto cell, through the Measurement Control message in which Cell Identity Reporting Indication=TRUE and ANR Indicator=TRUE are set. The ANR is an abbreviation of Automatic Neighbour Relation.

For the ANR Indicator that is a newly defined information element (parameter), TRUE and FALSE may be set as values thereof. ANR Indicator=TRUE is for making a request to measure the System Information broadcast by a neighbour cell to acquire the UTRAN Cell Identity.

When receiving the message, UE 801 measures the System Information broadcast by the neighbour cell, acquires the Cell Identity in the measured System Information, and notifies HNB 102 of the Cell Identity through the Measurement Report message.

Modification for handling the Measurement Control message including the ANR Indicator in the 3GPP TS25.331 will be described.

A description related to an instruction to report the Cell Identity (that is, the UTRAN Cell Identity) of the measurement target cell is modified as follows. If Cell Identity Reporting Indicator=TRUE and ANR Indicator=TRUE are set in the received Measurement Control message, the UE sets the Cell Identity of the measured cell, into the Measurement Report message. Moreover, if the received Measurement Control message includes a setting different from the above setting, the UE regards the setting as Cell Identity Reporting Indicator=FALSE.

<Description Example of 3GPP TS25.331>

FIG. 12 is a diagram showing a description example of the 3GPP TS25.331 that enables the third exemplary embodiment.

With reference to FIG. 12, as a second "NOTE" in Section 10.3.2.2, it is additionally described that the RNC Identity in a case in which a femto cell is made up of HNB, may be stored in the Cell Identity information element.

Moreover, in Section 10.3.7.5, it is additionally described that the ANR Indicator may be set as Cell reporting quantities.

In addition, furthermore, in the description example of the 3GPP TS25.331, Section 8.6.7.7, it may be described as follows.

"If the IE "Cell Identity" is set to TRUE, the UE shall
1> if the IE "ANR indicator" is set to TRUE,
set IE "cell identity" of the measured cell.
2> Otherwise,
treat the IE as if the IE "Cell Identity" is set to FALSE."

FIG. 13 is a sequence diagram showing operations when the UE notifies the identifier of the femto cell in response to a request from the HNB, in the wireless communication system according to the third exemplary embodiment.

With reference to FIG. 13, when an RRC Connection is established between UE 801 and HNB 102 (step S301), HNB 102 transmits the Measurement Control message in which Cell Identity Reporting Indicator=TRUE and ANR Indicator=TRUE, to UE 801 (step S302). UE 801 receives the message.

On the other hand, HNB 101 sets the RNC id (HNBGW) that is the identifier of HNBGW 301 and the RNC id (HNB) that is the identifier of HNB 101, into the UTRAN Cell Identity information element in the System Information on femto cell 201 formed by HNB 101 (step S303). Thereby, the System Information including the identifier of HNBGW 301 and the identifier of HNB 101 is broadcast in femto cell 201 (step S304).

Here, it is assumed that UE 801 is moving toward femto cell 201 in the state where UE 801 connects to and communicates with HNB 102. When UE 801, which has received the Measurement Control message in step S302, enters the area of femto cell 201 of HNB 101, UE 801 receives the System Information on femto cell 201 that is broadcast by HNB 101.

Then, UE 801 acquires the UTRAN Cell Identity information element from the received System Information (step S305). In this UTRAN Cell Identity information element, the identifier of HNB 101 and the identifier of HNBGW 301 are stored.

Then, UE 801 transmits the Measurement Report message including the acquired UTRAN Cell Identity information element, to HNB 102 (step S306).

HNB 102 acquires the identifier of HNB 101 (RNC id (HNB)) and the identifier of HNBGW 301 (RNC id (HNBGW)) that are included in the UTRAN Cell Identity information element, from the Measurement Report message (step S307).

Note that the measurement target cell can be designated in the request for the UTRAN Cell Identity using ANR Indicator=TRUE, and such designation is effective for the SON function. The designation of the measurement target cell can be performed for each cell, and a cell whose configuration information has already been comprehended can also be designated.

Moreover, as the cell arrangement in the neighbourhood of femto cell 201 formed by HNB 101, the various configurations are conceivable depending on the cell design of the system. The macro cell may exist so that the macro cell includes femto cell 201 formed by HNB 101, or so that the macro cell overlaps femto cell 201. In that case, UE 801 may notify the NodeB forming the macro cell or the RNC to which the NodeB belongs, of the identifier of HNBGW 301.

As described above, according to the present exemplary embodiment, since the RNC id (HNBGW) that is the identifier of the HNBGW is stored in the UTRAN Cell identity that is the existing parameter, there is no need to add a new parameter (information element) to the System Information broadcast by the HNB.

Moreover, according to the present exemplary embodiment, since notification of the UTRAN Cell identity can be requested through the Measurement Control message, it is possible to set a cell including an unknown network configuration, as the measurement target, and to acquire only the UTRAN Cell Identity that can be notified by a designated UE.

Fourth Exemplary Embodiment

Also in a fourth exemplary embodiment, similarly to the third exemplary embodiment, the method of notifying the identifier of HNBGW 301 in the first or second exemplary embodiment is further embodied. As the basic configuration examples of the wireless communication system according to the present exemplary embodiment, configurations as shown in FIGS. 1 and 2 are conceivable.

In the fourth exemplary embodiment, in order to broadcast the identifier of HNBGW 301 to which HNB 101 belongs, HNB 101 includes the RNC id (HNBGW) in a newly defined information element referred to as "RNC identity" in the System Information.

FIG. 14 is a sequence diagram showing operations when the UE notifies the identifier that is to be transmitted to the femto cell in response to the request from the HNB, in the wireless communication system according to the fourth exemplary embodiment.

With reference to FIG. 14, when the RRC Connection is established between UE 801 and HNB 102 (step S401), HNB 102 transmits the Measurement Control message in which RNC Identity Reporting Indicator=TRUE is set, to UE 801 (step S402). UE 801 receives the message.

On the other hand, HNB 101 sets the RNC id (HNBGW) that is the identifier of HNBGW 301, into a new parameter, the RNC Identity information element included in the System Information on femto cell 201 formed by HNB 101 (step S403). Thereby, the System Information including the identifier of HNBGW 301 is broadcast in femto cell 201 (step S404).

Here, it is assumed that UE 801 is moving toward femto cell 201 in the state where UE 801 connects to and communicates with HNB 102. When UE 801, which has received the Measurement Control message in step S302, enters the area of femto cell 201 of HNB 101, UE 801 receives the System Information on femto cell 201 that is broadcast by HNB 101.

Then, UE 801 acquires the RNC Identity information element from the received System Information (step S405). In this RNC Identity information element, the identifier of HNBGW 301 is stored.

Then, UE 801 transmits the Measurement Report message including the acquired RNC Identity information element, to HNB 102 (step S406).

HNB 102 acquires the identifier of HNBGW 301 (RNC id (HNBGW)) that is included in the RNC Identity information element, from the Measurement Report message (step S407).

Note that the measurement target cell can be designated in the request for the RNC Identity using RNC Identity Reporting Indicator=TRUE, and such designation is effective for the SON function. The designation of the measurement target cell can be performed for each cell, and a cell whose configuration information has already been comprehended can also be designated.

Moreover, as the cell arrangement in the neighbourhood of femto cell 201 that is formed by HNB 101, various configurations are conceivable depending on the cell design of the system. The macro cell may be present so that the macro cell includes femto cell 201 formed by HNB 101, or so that the macro cell overlaps femto cell 201. In that case, UE 801 may notify the NodeB forming the macro cell or the RNC to which the NodeB belongs, of the identifier of HNBGW 301.

According to the present exemplary embodiment, since notification of the RNC identity can be requested through the Measurement Control message, it is possible to set a cell including an unknown network configuration, as the measurement target, and to acquire only the RNC Identity that can be notified by a designated UE.

Fifth Exemplary Embodiment

In the above described first to third exemplary embodiments, the example of the system including the architecture of CN-HNBGW-HNB-UE, which is generally referred to as a femto system in an RANGW scheme, is shown. However, the present invention is not limited thereto. As another example, the present invention is also similarly applicable to a femto system in an IMS (IP Multimedia Subsystem) Femto scheme. In the femto system in the IMS Femto scheme, an IMS function is included in the HNB.

FIG. 15 is a block diagram showing the configuration of the wireless communication system according to a fifth exemplary embodiment. In FIG. 15, IMS-Femto 101 is arranged instead of HNB 101 shown in FIG. 2, and IMS-GW 301 is arranged instead of HNBGW 301. In this configuration, IMS-Femto 101 that is the HNB that includes the IMS function broadcasts an identifier of IMS-GW 301 to which IMS-Femto 101 itself belongs.

Sixth Exemplary Embodiment

As still another example, the present invention is also similarly applicable to a femto system in an E-UTRAN network. In the femto system in the E-UTRAN network, an architecture of MME-HeNBGW-HeNB-UE is employed.

FIG. 16 is a block diagram showing the configuration of the wireless communication system according to a sixth exemplary embodiment. In FIG. 16, HeNB 101 is arranged instead of HNB 101 shown in FIG. 2, and HeNBGW 301 is arranged instead of HNBGW 301. In this configuration, HeNB 101 broadcasts an identifier of HeNBGW 301 to which HeNB 101 itself belongs.

Seventh Exemplary Embodiment

As still another example, the present invention is also similarly applicable to a femto system that is generally referred to as the RANGW scheme. In the femto system in the RANGW scheme, the architecture of CN-HNBGW-HNB-UE is employed.

FIG. 17 is a block diagram showing the configuration of the wireless communication system according to a seventh exemplary embodiment. In FIG. 17, Femto-BTS 101 is arranged instead of HNB 101 shown in FIG. 2, and RNC 701 is arranged instead of HNBGW 301. In this configuration, Femto-BTS 101 broadcasts an identifier of RNC 701 to which Femto-BTS 101 itself belongs.

Note that hardware or software configurations of the NodeB in the above described exemplary embodiments are not limited, and various configurations are possible. For example, the NodeB in the exemplary embodiments may perform each of the above described each processing operations by causing an embedded processor to execute a software program.

While the exemplary embodiments have been described above, the present invention is not limited to only these exemplary embodiments, and these exemplary embodiments may be used in combination, or the configuration may be partly modified, within the scope of the technical ideas of the present invention.

The invention claimed is:

1. A Home Node B (HNB) comprising:
a receiver configured to receive, from a Home Node B Gateway (HNB-GW), information identifying the HNB-GW as the HNB-GW with which the HNB is registered;
a processor and a non-volatile memory storing software which, when executed, enables the processor to implement a setter which includes, within bits of system information dedicated to a Radio Network Controller (RNC) identifier, the information identifying the HNB-GW, wherein the bits of the system information dedicated to the RNC identifier are within cell identity information included in the system information; and a transmitter configured to transmit, to a user equipment during a mobility procedure, the system information comprising the RNC identifier;

wherein the user equipment receives, from a radio network, a measurement control message comprising an indicator which is different from a cell identity report indication, and determines whether or not to include the cell identity information in a measurement report based on the indicator, and transmits, to the radio network, the measurement report, and wherein the processor sets another RNC identifier identifying the HNB together with the RNC identifier identifying the HNB-GW within the cell identity information included in the system information, instead of cell identity in the cell identity information.

2. The HNB according to claim 1, wherein the user equipment transmits the measurement report to an RNC within the radio network.

3. A user equipment comprising:
a receiver configured to receive, from a Home Node B (HNB), system information that comprises a cell identifier comprising bits dedicated to a Radio Network Controller (RNC) identifier, wherein the bits dedicated to the RNC identifier are within cell identity information included within the system information and comprise information identifying a Home Node B Gateway (HNB-GW); and
a transmitter configured to transmit a measurement report to a radio network,
wherein the information identifying the HNB-GW is provided by the HNB-GW and identifies the HNB-GW as the HNB-GW with which the HNB is registered, and
wherein the bits dedicated to the RNC identifier comprise the information identifying the HNB-GW during a mobility procedure;
wherein the receiver is further configured to receive, from a radio network, a measurement control message comprising an indicator which is different from a cell identity report indication; and
wherein the user equipment is configured to determine whether or not to include the cell identity information in the measurement report based on the indicator, wherein the cell identity information in the system information includes another RNC identifier identifying the HNB together with the RNC identifier identifying the HNB-GW instead of cell identity in the cell identity information, and wherein the transmitter is further configured to transmit the measurement report including the cell identity information.

4. The user equipment according to claim 3, wherein the measurement report enables the RNC to make a decision to relocate the user equipment to the HNB from the RNC having a radio resource control connection with the user equipment.

5. The user equipment according to claim 3, wherein the transmitter is configured to transmit the measurement report to an RNC within the radio network.

6. A method for a user equipment, the method comprising:
receiving, from a Home Node B (HNB) during a mobility procedure, system information that comprises a Radio Network Controller (RNC) identifier, which is provided by a Home Node B Gateway (HNB-GW) in order to identify the HNB-GW with which the HNB has been registered, wherein the RNC identifier is contained within bits of cell identity information which is included in the system information;
receiving, from a radio network, a measurement control message comprising an indicator which is different from a cell identity report indication,
determining whether or not to include the cell identity information in a measurement report based on the indicator, and
transmitting, to the radio network, the measurement report,
wherein the cell identity information in the system information includes another RNC identifier identifying the HNB together with the RNC identifier identifying the HNB-GW instead of cell identity in the cell identity information, and
wherein the transmitting further comprises transmitting the measurement report including the cell identity information.

7. The method according to claim 6, wherein the transmitting the measurement report comprises transmitting the measurement report to an RNC within the radio network.

* * * * *